United States Patent [19]

Germanton

[11] 4,315,247

[45] Feb. 9, 1982

[54] SECURITY SYSTEMS EMPLOYING AN ELECTRONIC LOCK AND KEY APPARATUS

[76] Inventor: Charles E. Germanton, 38 Mountain Ave., Summit, N.J. 07901

[21] Appl. No.: 65,769

[22] Filed: Aug. 13, 1979

[51] Int. Cl.[3] .............................................. H04Q 9/00

[52] U.S. Cl. .................................... 235/382; 340/543; 340/825.31; 235/449; 235/454

[58] Field of Search ................. 340/64, 149 A, 149 R, 340/147 MD, 543; 235/382

[56] References Cited

U.S. PATENT DOCUMENTS

| | | | |
|---|---|---|---|
| 3,906,447 | 9/1975 | Crafton | 340/149 A |
| 3,958,231 | 5/1976 | Hoffman | 340/149 A |
| 4,048,475 | 9/1977 | Yoshida | 340/149 A |
| 4,048,618 | 9/1977 | Hendry | 340/149 A |
| 4,095,739 | 6/1978 | Fox | 235/382 |
| 4,218,674 | 8/1980 | Brosow | 340/149 A |

*Primary Examiner*—Harold I. Pitts

*Attorney, Agent, or Firm*—Arthur L. Plevy

[57] ABSTRACT

A security system employs a combination memory and processor which upon insertion of a key, is operative in a first mode to store a predetermined digital code associated with the key in a memory associated with the processor. During this first mode, any digital code manifested by any one of a plurality of keys is automatically stored in the memory by the insertion and withdrawal of the selected key. Thereafter, the processor serves to recognize only the selected key to enable activation of a controlled mechanism in a second mode again manifested by the insertion of the selected key within the access slot. The combination processor can be paralleled to enable one to control a single entranceway by means of a plurality of keys each associated with one processor or to employ different keys at one location to initiate other functions as activation of burglar alarms and so on. The system has applicability as a security system and has utility in many commercial and residential applications.

9 Claims, 10 Drawing Figures

FIRST POLARITY INSERTION CONTROL
SECOND POLARITY INSERTION CONTROL
CLOCK GATE
LAMP SOURCE
TO CONTROLLED MECHANISM
TO OTHER FIGS. 3
STAGE 1-A
STAGE 1-B
STAGE 2-A
STAGE 2-B
STAGE 3-A
STAGE 3-B
SHIFT
READ
WRITE
TRACK-1
TRACK-2
TRACK-3
TRACK-4
TRACK-5
S1A
S1B
S2A
S2B
S3A
S3B

Fig. 4
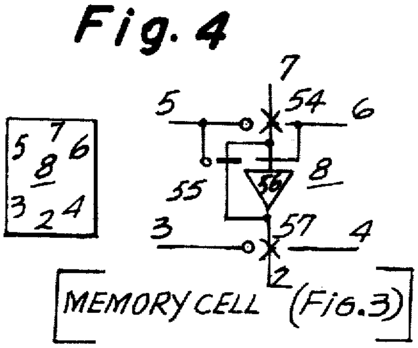
Fig. 5
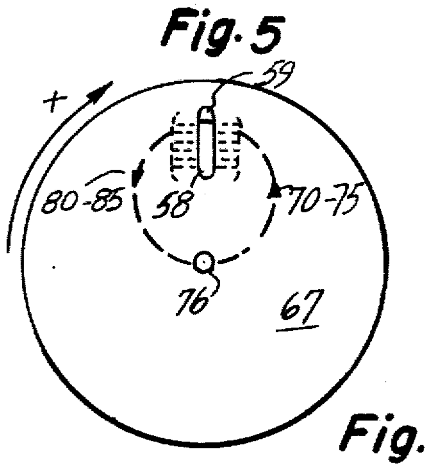
Fig. 6
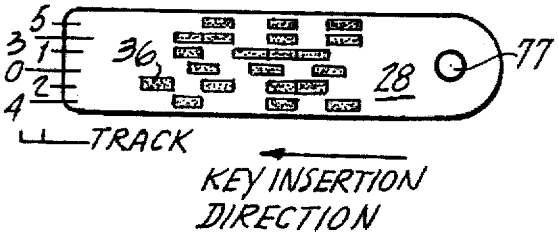
Fig. 7A
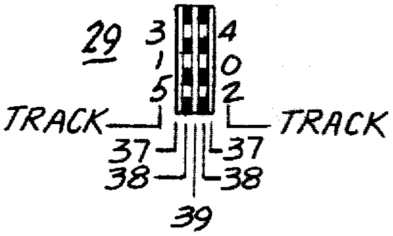
Fig. 7B
Fig. 7C
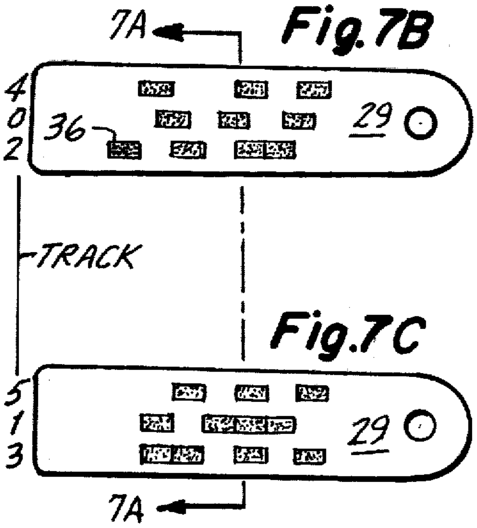
Fig. 8
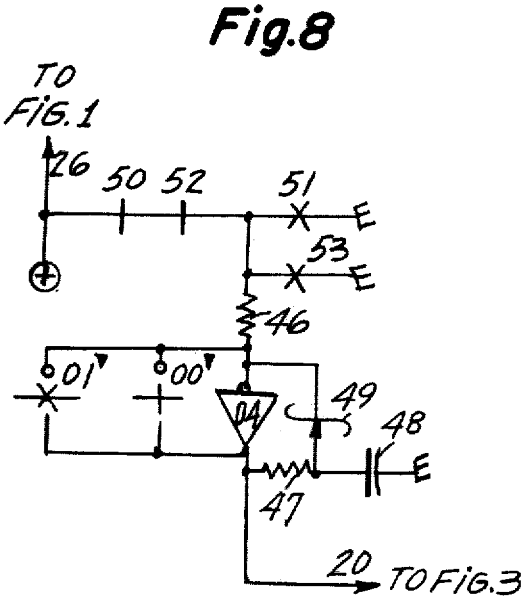

SECURITY SYSTEMS EMPLOYING AN ELECTRONIC LOCK AND KEY APPARATUS

BACKGROUND OF INVENTION

This invention relates to a lock apparatus and more particularly to an electronically operated lock and key capable of accommodating a plurality of different control combinations.

Essentially, the most basic security system constitutes a simple lock and key of which there are a tremendous variety of devices and types. Accordingly, the prior art is replete with a large number of patents directed towards electronic lock and key assemblies. The advantage of electronic locks over their mechanical counterparts are relatively obvious in that such assemblies can offer greater protection in guarding against unauthorized entry, key duplication or "lock picking".

The prior art envisions various schemes, most of which provide a control electronic assembly which upon activation by a proper combination or code, operates a solenoid or a controlled mechanical or electromechanical latch. The control assemblies of such electronic locks employ various electrical and magnetic coding schemes such as pulse codes, binary codes, selective frequency determination and others to determine correlation between a predetermined condition as manifested by a particular key or credit card arrangement.

A major disadvantage of many of the prior art devices is that the control unit exhibits a fixed response and therefore can be operated by only a single coded key. In order to implement a change in the key arrangement, one has to rewire, change components or perform other operations such as reprogramming which thereby requires additional equipment and is relatively difficult and expensive to implement. Still other prior art systems cannot, without extensive redesign, accommodate a plurality of different key in a simple and reliable manner.

The ability to rapidly and efficiently change a combination of a lock to enable access by means of any one of a plurality of keys is an important feature in certain business activities such as motels, hotels, vaults and so on. In the operation of such systems which cater to guests or transient trade, keys are exchanged thousands of times a year. Inevitably, such keys are stolen, lost or misplaced and under conventional sytems, an unauthorized person possessing such a key would have direct access to the premises. This, of course, accounts for huge losses by such establishments concerning stolen property and so on.

Many other applications will become apparent to those familiar with the art once a reliable and efficient electronic key and lock assembly are devised to enable the use of such a system in various and diverse applications.

It is therefore advantageous to provide a key and lock assembly which would be capable of rapid and efficient operation at a relatively modest cost, while further providing the ability to simply and reliably alter the combination as desired without the use of external or additional equipment. These aspects are particularly necessary to eliminate the problem of unauthorized access as will be described subsequently.

BRIEF DESCRIPTION OF THE PREFERRED EMBODIMENT

An electronic lock and key system for activating a controlled mechanism to permit entry to a secured area, comprising key means having located thereon a selected one of a plurality of unique digital codes, receptacle means for receiving said key means and for providing an electrical signal indicative of said selected code, processor means including a memory and operative in a first storage mode responsive to said signal for storing said selected code, upon insertion of said key means in said receptacle during said first mode, and operative in a second mode for thereafter comparing said selected code as manifested by said electrical signal with said code as stored to provide a comparison between the same and means providing a signal for activating said controlled mechanism upon a favorable comparison.

BRIEF DESCRIPTION OF THE FIGURES

FIG. 1 depicts a schematic diagram of a sensing system used in this invention.

FIG. 2 depicts an optoelectronic control circuit for use with the sensing and processor circuitry.

FIG. 3 shows a schematic diagram of a combination memory and processor employed in the system.

FIG. 4 shows a schematic and block diagram of the internal circuitry of a memory cell employed in the processor of FIG. 3.

FIG. 5 is a schematic view of a control receptacle incorporated in a door knob control by this system.

FIG. 6 is a front planar view of an optoelectronic key for use with transmitted light.

FIGS. 7A, B and C are respectively a cross-section and a right and left side view of a key for use with reflected light.

FIG. 8 shows a schematic diagram of a magnetic control circuit which can be employed in lieu of the circuit of FIG. 2 for a magnetically operated system.

DETAILED DESCRIPTION OF THE INVENTION

Figures 1, 2, 3:
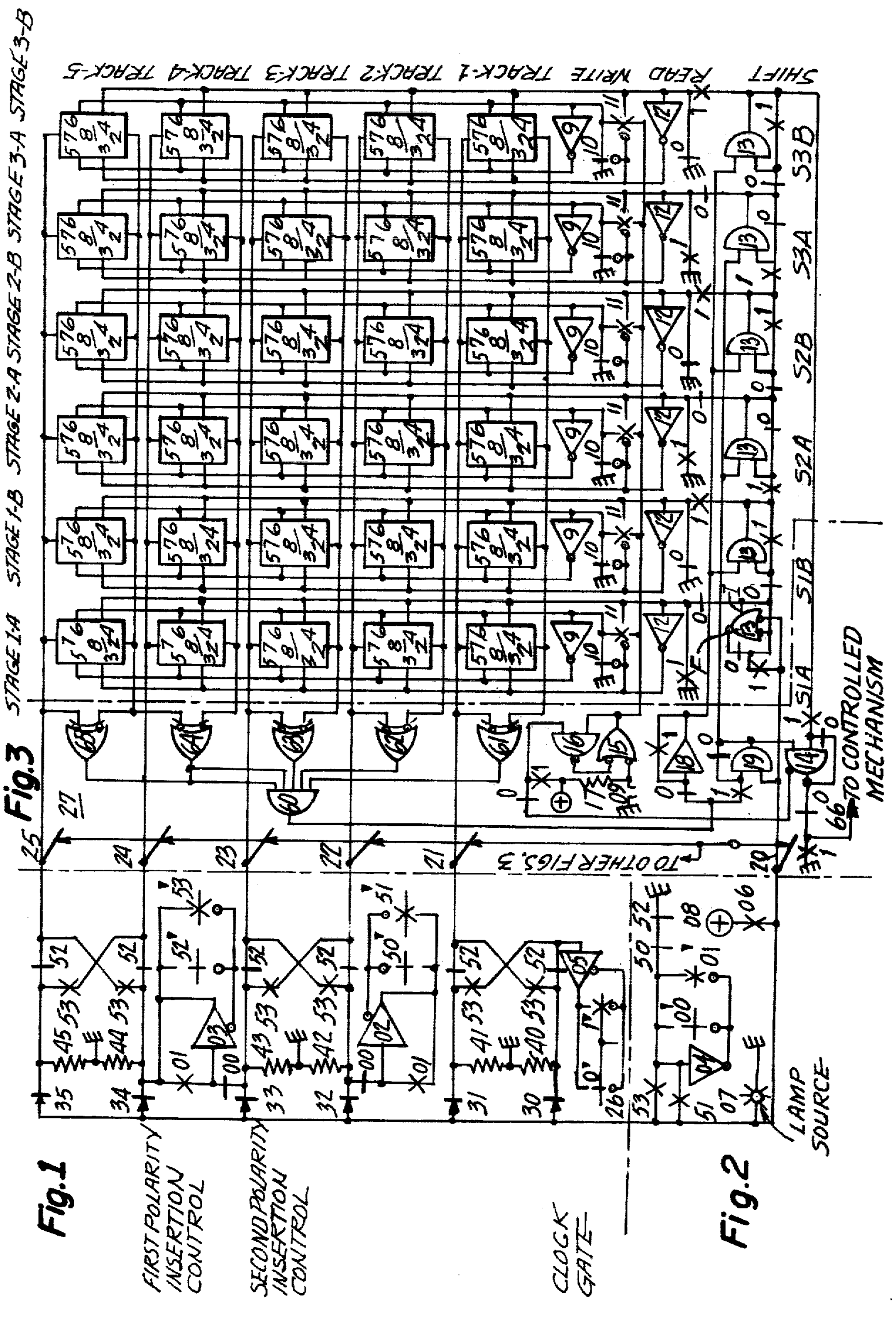
FIGS. 1, 2 and 3 are combined in a single drawing to show an optoelectronic key sensing and control circuit including a combination memory and processor according to this invention.

Before proceeding in a detailed explanation of the accompanying drawings, it is believed that a brief description of the applicable terms is warranted in order to enable the reader to derive a clearer understanding of the invention.

In the following description, reference will be had to the term gate. Essentially, a gate is a logical circuit element which includes inverters, buffers, special function gates and a host of other devices which perform precise functions upon the application of suitable signals to the input terminals. It is understood that it is well within the ken of one skilled in the design and formulation of logic circuits that such gates designated as AND, OR, NAND, NOR and so on, can be interchanged depending upon the nature of the logic and the input and output levels to perform analogous functions. Hence, many of the drawings contain redundant numerals to depict logic elements which perform similar functions and which functions can be simulated by an alternate configuration. It is felt by using common reference numerals to describe such common components, the reader will gain a clearer insight to the nature of the circuitry while further developing an appreciation for the reduction in cost and complexity associated with the use of redundant circuit modules.

Briefly, FIGS. 1-6 depict an optoelectronic key control system which employs transmitted light and optical detection for implementing a coded signal. It is, of course, understood at the onset that the optical systems can be replaced by systems employing other sensing techniques such as magnetic or direct reading digital systems.

Before a discussion of FIGS. 1,2 and 3, reference is made to FIGS. 4,5 and 6 in which FIG. 4 depicts a schematic diagram of a memory cell which is employed in the operation of the invention. The memory cell is shown on the left in a schematic representation and is depicted by reference numeral 8. The numerals 2-7 represent various input and output terminals which when accessed, enable one to write or read a predetermined binary level stored in the memory cell 8.

Essentially, such memory cells as 8 may comprise MOS devices which are capable of being implemented by integrated circuit techniques and which at the present state of the art, are relatively inexpensive and widely available. For examples of suitable devices and schematics as well as techniques for fabricating the same, reference is made to a text entitled COS/MOS INTEGRATED CIRCUITS MANUAL by RCA, Somerville, N.J., published in 1971.

Referring to FIG. 4, when control leads 5 and 6 are activated with a low signal level on lead 5 and a high signal level on lead 6, switch 54 is closed and switch 55 opens. This condition is a write condition and the signal level on lead 7 is written into and hence, stored by cell 8.

As can be seen from FIG. 4, switches 54 and 55 are depicted by conventional circuit symbols wherein an X stands for a normally open switch 54, while a bar stands for a normally closed switch 55. Such switches are shown schematically in FIG. 4 but in actual practice are MOS devices commonly referred to as transmission gates. Such transmission gates are described in the above noted text on pages 16-19. These switches generally are of the dual channel type and a P channel and an N channel device is employed in a basic inverter configuration.

In such devices, the switch is controlled by two electrodes and by suitable biasing of the electrodes, the device operates exactly as a mechanical switch having a relatively large impedance in the open state and small impedance in the closed state. It is, of course, understood that a single channel device whose impedance is controlled by a single electrode, can be employed in lieu of a dual channel device.

As above indicated, when the write-in leads 5 and 6 are activated, a signal is stored in cell 8. In this operation, gate 56 is activated or deactivated if the potential on lead 7 is high or low respectively. The deactivation of control leads 5 and 6 deactivates switches 54 and 55 which thereby disconnect lead 7 and lock gate 56 after a write-in function. Hence, upon deactivation of leads 5 and 6, gate 56 has stored therein a logic zero or a logic one depending upon the write-in signal on lead 7.

To perform a readout function, leads 3 and 4 are activated with a low placed on lead 3 and a high on lead 4. This in turn causes switch 57 to close effectively connecting the output of gate 56 to the readout lead 2. In this manner, the binary bit stored in the cell 8 is transferred to output lead 2 for future access.

As will be shown, the memory cell 8 of FIG. 4 is employed to store various combinations capable of being provided by this system and which combinations serve to actuate a lock upon insertion of a suitable key.

Referring to FIG. 5, there is shown a key aperture or receptacle 58 incorporated in a door knob 67. To the right of receptacle 58 is a bundle of six optical fibers 70-75 which conduct light from a suitable source of light 76 to one side of the receptacle 58. On the other side of the receptacle 58 and aligned with the optical fibers 70-75 is an additional bundle of fibers 80-85. These fibers, as will be explained, receive light as interrupted by a key member to couple the light to appropriate sensors depicted in FIG. 1.

Shown located within the receptacle 58 is a mechanically operated latch or switch 59. The switch 59 operates when impinged against by the insertion of a key into the receptacle and enables, as will be explained, the operation of the latch and key assembly.

It is understood that if the light sources or transmitters such as 70-75 and the sensors or receptors are located on opposite walls of the receptacle as shown in FIG. 5, the keyhole 58 is open and can be easily cleaned and maintained. To offer further protection, the optical fibers which conduct and direct light within the receptacle 58 are properly aligned and maintained in a position by embedding the same in a plastic or a suitable support assembly. It is understood that such optical fibers are of an extremely small diameter and many suitable types are widely available for such use.

Referring to FIG. 6, there is shown a key 28 which can be employed for insertion into receptacle 58 of FIG. 5 and which is suitable for operation of the control assembly to be described. Essentially, the key is shown as a relatively rectangular member with an aperture 77 for ease in coupling the same to a keyring or other device. It is, of course, understood that the key 28 is a relatively planar member and any suitable configuration other than that shown in FIG. 6 could be employed as well.

The key essentially consists of an opaque film of bismuth which is sandwiched between two transparent plastic sheets and is relatively thin to enable insertion into the receptacle 58. The key 28 has encoded thereon various bits of information which are representative of binary ones or zeroes and which are encoded in six tracks designated as 0,1,2,3,4 and 5. Digital encoding of bismuth is a known technique and can be accomplished by the selective melting of the bismuth by means of a suitable laser beam. The laser selectively melts the bismuth which by surface tension flows to the periphery of the laser impinged area. Hence, the key 28 after encoding appears to be all black except for the small transparent windows represented by the small rectangular areas shown in FIG. 6.

It is noted that the key 28 is symmetrical about its longitudinal center line and hence, one can insert the key with either track 5 at the top or track 4 at the top. Accordingly, it is understood that tracks 5,3,1,0,2,4 are interchangeable in position with tracks 4,2,0,1,3,5 or in other words, track pairs 0-1, 2-3, 4-5 are symmetrically positioned. Based on such factors, it is apparent that in order to correctly read the digital information stored on the key, determination of the insertion polarity is essential. Hence, shown located on the key in alignment with the track designated as 2 is a premessage bit 36. This bit, as will be explained, is first detected to initiate verification sequence.

Track 0 which is located above track 2 and below track 1 generates clock signals for the system and is positioned near the centerline or middle of the key in order to minimize the effect of angular deviation during insertion of the key 28 into receptacle 58.

For circuit purposes, the premessage bit 36 cannot be located in clock track 0 or in track 1 with which track 0 is paired. The premessage bit 36 as located in track 2 reconciles the polarity of the sense-read circuit with the insertion polarity of the key.

Referring to FIGS. 1,2 and 3, a complete schematic diagram of an entire processor is depicted. Before key insertion into the receptacle, a low level signal is applied via lead 20. This low signal level activates gate 13 in stage 1A of the control circuit depicted in FIG. 3. The symbol for gate 13 in stage 1A differs from the other gates 13 associated with stages 1B to 3B.

According to the above description, the devices are identical. However, the functions are not. The gate 13 associated with stage 1A indicates that if either input is at a low level, the intermediate output I is high and the final output F is low. The logic function is easily and conventionally performed. Accordingly, upon receipt of the low signal via lead 20, the first gate 13 locks and the I outputs is high. This activates through a switch 0 gate 12 associated with stage 1A and located in the schematic directly above gate 13. The output of gate 12 activates switches 10 and 11 associated with stage 1A and all readout inputs 3 and 4 of the memory cells 8 in stage 1A or the five cells located directly above gate 12 in the schematic. Located in control module 27 is a gate 15. During this operation, the output of gate 15 is in a low condition and hence, maintains gate 9 of stage 1A in the deactivated state.

The above brief description of FIGS. 1,2 and 3 assumes that the control module depicted therein is in its quiescent state and a key such as 28 has not been inserted into receptacle 58 of FIG. 5.

Before further describing the system, it is understood that a key such as 28 of FIG. 6 is formed at a factory or other location with any predetermined code located thereon. The code impressed upon the key with the exception of the control track 0 is unique.

If one refers to FIG. 3, one immediately sees that thirty memory cells 8 are employed. It is therefore understood that with the use of thirty cells, one can provide 1,073,741,824 unique combinations and hence, that number of keys which is the number two to the power of thirty. In a similar manner, it is of course, understood that more or less memory cells can be used to therefore achieve more or less key combinations.

It is a major aspect of the present invention to enable any arbitrary key to have its code stored within the control processor of FIG. 3 to thereby enable that key to always activate that processor. If the key is lost or stolen, another key of the same physical configuration as key 28 of FIG. 6 can then be employed to reprogram the same exact control processor of FIG. 3 to thereby enable the processor to accommodate a new key, etc. Hence, in this system, any one of a huge number of keys can be used with any control processor and any different key of the plurality can replace a lost or a stolen key and allow the same exact processor to be programmed with the new key combination without the use of any additional or peripheral equipment.

The programming of a key for subsequent use of that key in conjunction with the processor and circuitry shown in FIGS. 1,2 and 3 will now be described. The user of the system receives a key as 28 of FIG. 6, which key has prestored thereon any code in tracks 0–5 as implemented by the manufacturer. The code is selected in accordance with the number of memory cells used in a particular lock and key system and which in this example, constitutes thirty such cells.

The control mechanism associated with the lock, as indicated, is a conventional solenoid or an electromechanical latch which upon receipt of a suitable electrical signal, will operate to enable one to open a door. Such techniques are well known. The user, prior to insertion of the key, momentarily shorts or bridges terminals 09 associated with one input of gate 15. This is done by the use of a conducting member such as a pin. Bridge contact 09 immediately locks gate 15 via gate 16 and forces the output of gate 15 to go to its high condition.

To gain access to terminals 09, many mechanical devices can be employed. A particular device which has utility in providing a mechanical lock assembly for operation of this invention and to prevent unauthorized access to terminals 09, is depicted in U.S. Pat. No. 4,019,355 entitled PUSHBUTTON COMBINATION LOCK issued on Apr. 26, 1977 to Charles E. Germanton, the inventor herein. It is understood and noted that access to terminals 09 preferably should be had by a person in control of security for a particular establishment and the mechanical lock configurations described in that patent depict a suitable controlled mechanical assembly to enable access to a terminal or portion of the assembly through unique rotation of the knob structure. It is, of course, understood that many other techniques for concealing such terminals as well as alternate mechanical configurations are applicable as well.

Hence, upon shorting terminals 09 as above indicated, gate 15 locks via gate 16. The output of gate 15 activates gate 9 associated with stage 1A and via gate 9, all control inputs 5 and 6 of memory cells 8 are also enabled. In each memory cell 8 associated with stage 1A, the low input through the write-in lead 7 is registered and read out through lead 2 thereby activating the exclusive-OR gates 61–65 which have one terminal each coupled to terminal 2 of the memory cells. Gate 60 is also activated having an input coupled to each output of gates 61–65. Activation of gate 60 activates gate 18 and in stage 1B, gate 13.

The system is now ready for key insertion with the above transitions occurring upon shorting of terminals 09. As indicated, upon insertion of the key 28 of FIG. 6 into receptacle 58 of FIG. 5, the key first impinges against switch 59. The activation of switch 59 closes contact 06 (FIG. 2) which couples a source of potential at terminal 08 to energize the light source 07. The closing of contact 06 applies a high input to thereby immediately activate the sensing elements 30,31,32,33,34 and 35 (FIG. 1), located at the left side of the diagram. The elements 30–35 are optical diodes also referred to as photodiodes and upon application of a suitable bias potential, will vary their impedance according to incident light. At the instant the light source 07 is activated, all the sensors are in a high impedance state, illumination being cut off by the leading edge of the key 28.

As key insertion continues, the premessage bit 36 in FIG. 6 activates sensor 32 of track 2 or 33 of track 3 strictly according to the polarity of insertion. Hence, according to this system, the key can be inserted with track 5 or 4 on top and according to the polarity of such insertion, the premessage bit 36 will activate either sensor 32 or 33.

If sensor 32 is activated, gate 02 associated with that sensor responds. Gate 02 activates switches 50, 51, the control electrodes of which are wired as shown for detached sample switches 50′, 51′. Switches 50 and 51 activate gate 04 in turn activating switches 00 and 01 which detach gates 02 and 03 from the sensors 30–35. Gate 02 is locked in this mode, while gate 03 is inhibited. All switches indicated by the numeral 52 in FIG. 1 still remain in the closed position. Hence, the outputs of sensors 31–35 are directly connected to the input leads 21–25, sensor 30 is directly connected to the clock gate 05 (FIG. 1).

Alternatively, if sensor 33 was activated by the premessage bit 36, gate 03, switches 52 and 53, gate 04 and switches 00 and 01 are activated. In this manner, gate 03 is detached and locked, while gate 02 is detached and inhibited. For this configuration, sensors 30, 33, 32, 35 and 34 are attached to leads 21–25 respectively and sensor 31 now supplies the input to clock gate 05.

It is therefore apparent that independent of the polarity of key insertion, the digital information in tracks 1–5 of the key is registered in processor tracks 1–5 respectively and the clock track 0 of the key is always coupled to the clock gate 05 of the logic circuitry.

As the key continues to be inserted in the slot, the bits in key tracks 1,3 and 4 activate the input leads 21,23 and 24 respectively thereby causing a logic 1 to be written into the memory cells 8 of stage 1A corresponding to tracks 1,3 and 4. A logic 0 continues to be registered in stage 1A memory cells of tracks 2 and 5 since there are no logic 1's located in these tracks on the key 28 as shown in FIG. 6. Gates 60–65, 18 and gate 13 in stage 1B continue in the activated state.

Referring to the clock track, one sees that as the key is inserted past a midpoint of the logic 1 bits in tracks 1,3 and 4, the clock bit in track 0 of the key activates gate 05. This activates the clock switches 0,1 of all FIGS. 3, which switches are shown coupled to all gates 12 and 13. Switches 0,1, lock gate 18 and in stage 1B, lock gate 13, activate gate 12, switches 10 and 11, gate 9 and all write-in and readout control inputs 3–6 of the memory modules of state 1B.

Activation of switches 0,1 in stage 1A in turn deactivates gates 13,12, switches 10 and 11, gate 9 and all write-in and readout control inputs 3–6 associated with stage 1A. In this manner, the logic 1 bits in the memory cells of tracks 1,3 and 4 and the logic 0 bits in memory cells associated with tracks 2 and 5 are stored in stage 1A. Hence, reading from the top to bottom of stage 1A, the memory cells have stored therein the binary notations of 0,1,1,0,1 which corresponds to tracks 5,4,3,2,1. It is understood that momentarily and based on the above described circuitry, the same bits are written into stage 1B as are now stored in stage 1A.

As key insertion passes the midpoint of the first clock pulse in track 0, the transition to the second set of digital bits is effected. Therefore, as shown in FIG. 6, a logic 1 is written into the memory cells of state 1B at tracks 2,3 and 5 and a logic 0 in the memory cells representative of tracks 1 and 4. Gates 60–65, 19 and in stage 2A, gate 13 are activated. As the key is inserted beyond the midpoint of the second set of digital bits, the first clock pulse is terminated thereby deactivating the clock switches 0,1 which lock gate 19 and in stage 2A, lock gate 13. Termination of this clock pulse further activates gate 12, switches 10, 11, gate 9 and all memory cell control inputs 3–6. In Stage 1B, switches 0,1 deactivate gates 13, 12, switches 10,11, gate 9 and all memory cell control inputs 3–6 thereby storing logic 1 bits in the memory cells associated with tracks 2,3 and 5 and logic 0 bits in the memory cells associated with tracks 1 and 4.

As key insertion continues, transition is made to the third set of bits consisting of a logic 1 in key track 1 and a logic 0 in each of key tracks 2–5 which are then written into the corresponding memory cells of stage 2A. Since the output signal now matches the input signal of each memory cell, the exclusive-OR gates 61–65 are activated thereby activating gates 60,18 and in stage 2B, gate 13.

As the key insertion passes the midpoint of the third set of digital bits, the second clock pulse in track 0 activates clock switches 0,1 which lock gate 18 and in stage 2B, lock gate 13, activate gate 12, switches 10 and 11, gate 9 and all memory cell control inputs 3–6. In stage 2A, activation of switches 0,1 deactivates gates 13 and 12, switches 10 and 11, gate 9 and all memory cell control inputs 3–6 thereby storing the third set of digital bits in the memory cell of stage 2A.

As the key is further inserted, the midpoint of the second clock pulse is passed and transition to the fourth set of digital bits is now effected. Logic bits corresponding to 1's in tracks 1–5 are written into the memory cells of stage 2B resulting in activation of gates 60–65, 19 and in stage 3A, gate 13. As the key moves past the midpoint of the fourth set of digital bits, the second clock pulse is terminated thereby deactivating clock switches 0,1 which lock gate 19 and, in stage 3A, lock gate 13 activating gate 12, switches 10,11, gate 9 and all memory cell inputs 3–6. In stage 2B, the deactivation of switches 0,1 deactivates gates 13,12, switches 10 and 11, gate 9 and the memory control inputs 3–6 whereby the fourth set of digital bits are locked in and stored in the memory cells of stage 2B.

As key insertion continues, transition is made to the fifth set of digital bits consisting of logic 1's in key tracks 1,2 an logic 0's in key tracks 3,4 and 5 and these are written into the corresponding memory cells of stage 3A again resulting in the activation of gates 60–65, 18 and in stage 3B, gate 13. As key insertion passes the midpoint of the fifth set of digital bits, the third clock pulse activates switches 0,1 which lock gate 18 and in stage 3B, lock gate 13, activate gate 12, switches 10,11, gate 9 and the memory control inputs 3–6. In stage 3A, activation of switches 0,1 deactivate gates 13,12, switches 10,11, gate 9 and the memory control inputs 3–6 whereby the fifth set of digital bits are stored in the memory cells of stage 3A.

Similarly, as the key insertion passes the midpoint of the last clock pulse, transition is effected to the last set of digital bits consisting of logic 1's in tracks 3,4,5 and logic 0's in tracks 1,2 which are written into the corresponding memory cells of stage 3B resulting in activation of gates 60–65, 19 and 14. As key insertion passes the midpoint of the last set of digital bits, the termination of the last clock pulse in track 0 deactivates the clock switches 0,1 which lock gates 19,14 and activate lead 66 to the controlled mechanism. The controlled mechanism as indicated, is an electromechanical latch or other device which when operated, permits access to a door or a secured area.

Upon termination of the last clock pulse, index gates 15,16 and in stage 3B, gates 13 and 12 are all deactivated as well as switches 10,11, gate 9 and the memory control inputs 3–6 to thereby lock or store the last set of digital bits into the memory cells of stage 3B. Further insertion of the key beyond the last set of digital bits has no effect.

It is therefore seen that the above sequence is implemented extremely rapidly and completely in accordance with the speed at which the user inserts the key into the receptacle 58 associated with the knob of FIG. 5. At the end of key insertion in the above described mode, the data on the tracks 1–5 are stored in the memory cells comprising stages 1A to 3B, all under control as above described, of the clock pulses located in track 0.

As the key is withdrawn after insertion, the last clock pulse serves to activate the switches 0,1 which thereby deactivate gates 14, 19 and lead 66 to the controlled mechanism which has locked in the required mode of operation. After full key withdrawal, switch 59 of FIG. 5 opens contact 06 of FIG. 2 thereby deactivating the illuminating device 07, gate 04, switches 00, 01, gate 02 or 03, switches 50,51 or 52,53. In stage 1A, the low potential through device 07 in FIG. 2 activates gate 13 of stage 1A which locks and activates gate 12 and the readout control inputs 3–4 of all memory cells in stage 1A. Switches 10, 11 are also activated but with terminal 09 open, the index gate 15 is now in its normal state and these switches have no effect.

Hence, as one can ascertain, the system is now in its normal condition with all thirty bits associated with key 28 of FIG. 6 stored in the memory cells of the control processor shown in FIG. 3. If one now inserts the same key in receptacle 58, the same exact procedure occurs as above described, except that the write-in functions are omitted. In this manner, each of the thirty key bits is compared with the bits stored in memory and if a favorable comparison is made, the controlled mechanism is again activated.

It would be understood from the above described operation that if the key of FIG. 6 is lost or stolen, an additional key with the same format but with a different digital code can again be inserted into receptacle 58 after the shorting of contacts 09 associated with gate 15, the data on the key will now be stored in the memory cells of FIG. 3.

FIG. 7 depicts an optoelectronic key which is encoded with the same random combination as the key of FIG. 6 except that the key employs reflected light and hence, possesses three tracks on each face.

Referring to FIG. 7A, the core of such a key or center portion is of an opaque reflective material such as mylar or equivalent. The material is covered with a coating of bismuth 38 on each side and in turn, the bismuth coating 38 is covered by a transparent protective coating 37.

As shown in FIG. 7A, track pairs 0–1, 2–3, 4–5 are in polar symmetry about the central point of the cross-section or the point at which the horizontal and vertical center lines intersect. As with the key 28 of FIG. 6, the key 29 shown in FIGS. 7A to 7C would appear to be all black except for the small rectangular areas indicative of the digital and clock bits. In the reflected system, a source of light would impinge upon a bit area and be reflected into a properly positioned photocell. A black area of the key would cause no reflection and hence, would represent a logic 0 during the data accumulation mode. The systems which employ reflected light in lieu of transmitted light are well known in the optoelectronic art and one skilled in the art could in FIG. 5 readily locate light receptors 80,82,84 adjacent respectively to light transmitters 70,72,74 on one side of receptacle 58 and receptors 81,83,85 adjacent respectively to transmitters 71,73,75 on the other side.

As can be ascertained by again referring to FIGS. 1,2 and 3, all devices described may employ MOS technology and hence, such devices require extremely low currents while possessing extremely high input impedances. Accordingly, the control processor 27 of FIG. 3 can be repeated as evidenced by line 100 and hence, a plurality of identical units as shown in FIG. 3 can be arranged in parallel and located on a common integrated circuit module or on separate modules, all of which are compact and small enough to locate within a conventional knob and lock housing. In this manner, a plurality of different keys with different combinations can operate the same exact door if that is desired. In a similar manner, one key whose data is stored in the control processor of FIG. 3 can serve to operate the control mechanism which may be a door latch. Another key with a completely different digital code inserted into the same receptacle can be employed to operate another control mechanism which may be a burglar alarm indication. As one can ascertain, this aspect is accomplished by the paralleling of identical circuits of FIG. 3 with the control and readout circuitry of FIGS. 1 and 2.

The above described technique as understood operates with optoelectronic sensors but it is obvious that the system is not limited to the use of such sensors. Hence, the entire system could employ a key which is magnetically encoded. Essentially, the key would appear similar to that shown in FIG. 7 with the exception that the rectangular areas manifesting digital 1's would be magnetized areas and hence, the key would appear to be all one color as compared to the optoelectronic key.

Referring to FIG. 8, there is shown a circuit which replaces the circuit of FIG. 2 and which would operate with a magnetic system. In order to completely adapt the system shown for magnetic operation, one would replace sensors 30–35 with magnetic sensors and eliminate switch 59 of FIG. 5. Magnetic sensors are well known and many examples of such sensors exist in the prior art. The magnetic sensors 30–35 would be energized through lead 26 of FIG. 8. When the magnetic key is inserted into receptacle 58, the premessage bit will activate sensor 32 or 33, gate 02 or 03, switches 50,51 or 52,53 respectively. Switch 51 or 53 will activate gate 04 of FIG. 8 and switches 00,01 thereby again lock gate 02 or 03 as above described.

In FIG. 8, gate 04 also activates lead 20 of FIG. 3 and through resistor 47 charges capacitor 48. After a predetermined interval which affords ample time for key insertion and withdrawal, the potential on capacitor 48 reaches the breakdown level of zener diode 49. The resulting surge of current deactivates gate 04, switches 00,01, gate 02 or 03, switches 50, 51 or 52,53 respectively thereby restoring the system to normal. If the above return to normal occurs before the key is fully withdrawn in the magnetic system, subsequent sensing of a bit in track 2 or 3 initiates the same action as the initial sensing of the premessage bit 36.

In the interest of simplicity, signal enhancement has been omitted. For example, the fanout to the control electrodes of clock switches 0 and 1 may warrant a separate buffer gate in each processor per FIG. 3. In any event, a suitable number of processors can be operated in parallel and the processor can be extremely inexpensive as the entire circuitry depicted in FIG. 3 is capable of integration.

Keys which possess unique codes are provided in a relatively simple and economical manner. Such keys are automatically manufactured under microprocessor control whereby each key in a lot of $2^{30}$ or 1,073,741,824 keys is unique and can be provided by means of a simple program. With such keys, identification information such as the combination or the identity of the manufacturer is completely unnecessary and hence, the key is a relatively simple and inexpensive component primarily fabricated from plastic and bismuth in the case of an optoelectronic key or from plastic and a magnetic material in the case of a magnetic key. By avoiding identification on the key, if a key is lost and thereafter acquired by an unauthorized person, it becomes completely useless.

It is further understood that the operation of a controlled mechanism is relatively simple by employing such a key as one merely has to insert and withdraw the key instead of turning or twisting to rotate a tumbler arrangement.

The combination processor of FIG. 3 less signal enhancement comprises approximately five hundred six transistors or MOS devices and hence, can be manufactured as an extremely small integrated circuit in large quantities and at low cost.

As indicated, the combination processors of FIG. 3 can be paralleled for example, in a typical installation to include five such processors and encompassed within a combination lock as described in the above noted patent, U.S. Pat. No. 4,019,355, and used for a lock on a residential door. In this manner, five persons would have access to a main door via his own private key. All five keys would enable operating of the main door while each separate key would allow only the individual to access his own private quarters. The combinations possible with multiple processors are great. If is, of course, understood that if a key is lost or stolen, a new key can be employed with the same combination processor by implementing the above described written procedure.

As briefly described above, one can use a separate key with one of the processors to activate a burglar alarm which would be the controlled mechanism. This aspect of the system has many ramnifications as a user, for example, could have two keys; one of which will open a door as to a room or a safe, while the other would serve to activate a burgler alarm or provide an alert signal to notify an appropriate authority of an alarm condition.

The system is particularly applicable for use in the motel and hotel business. In this manner, if a quest fails to return a key, a new key can immediately program the vacated room. Since the keys are extremely inexpensive, the convenience in changing the combination far exceeds the particular value associated with a missing key.

Apartment buildings can use this system to advantage. In addition to all the features as described for a private residence, each occupant can use his personal key for ingress through the main entrance, and to receive his mail in a manner similar to that described later. If a multiple garaging facility is available, the same personal key is inserted momentarily into a common control receptacle to open both the main exterior door and the door to the individual stall. If the car commuter has garaging facilities at his place of employment, his personal key can also be used for that purpose. This system may also be employed for automatic employee identification to control ingress at an unmanned employee entrance.

A promising field of application is in automatic coin-operated control of rental facilities such as baggage lockers, car stalls and even small berths for mopeds, motorcycles and bicycles. By use of a common control station, coin handling costs as well as lock control costs are minimized. The system is arranged to give a visual indication if at least one rental unit is available. Deposit of the required amount indexes the available unit and insertion of the customer's key writes in his combination and opens the rental unit.

As a giant step toward automated postal service, the following novel application of this security system is proposed: Instead of door-to-door delivery of mail, the general public (non-business customers) would be served by neighborhood postal satellites, each within easy walking distance of the residents served. A new addressee applies for this service at the post office, specifying the satellite which he prefers to use. Normally, this would be the one nearest to his residence. The postal representative records the addressee's name and street address, which is not necessarily included in the mailing address, and gives the addressee a key with a tag bearing the expanded zip code. The additional zip code information specifies the satellite and the postal box which is unlockable by the key. In addition to the regular assignable boxes of standard size, a few auxiliary boxes including both standard size and oversize are provided to care for extra lettersize items or large parcels. When an auxiliary box is pressed into service, the unlock mechanism is arranged to function together with the unlock mechanism of the regular postal box, which can be accomplished by a simple cord patch. Momentary insertion of the postal key into the common control receptacle unlocks the associated box thereby placing the door ajar. The addressee then opens the door fully, retrieves the contents and recloses the door which latches into the locked condition. If the mail includes an oversize parcel, the letters as well as the parcel are put into the auxiliary box. The regular box, being empty, serves as a redundant reminder to check the auxiliary boxes.

A growing need for the advantages provided by this system is in car and truck security. The driver's general purpose key can be used to lock and unlock the doors and the ignition control. Assume the vehicle is locked. Momentary insertion of the key enables the door handles to open the doors and the ignition control to be pulled to its extended or "on" position. To lock, the ignition control is pushed to the inward or "off" position and, after disembarking, the doors are closed and the general purpose key is then momentarily inserted thereby locking the ignition control and disenabling the door handles. Security may be further enhanced whereby a special key is used to alternately alert and inhibit a tamper alarm system.

The system depicted above employs a memory which is activated to store a code which has been previously impressed upon a key based on any desired digital format. As indicated above, one can use more or less memory cells and hence, decrease or increase the number of combinations employed in the system. The memory depicted in FIG. 3 is a volatile memory and if a loss of power occurs, such memories conventionally lose data and hence, have to be reprogrammed. This, of course, is not a deterrent as reprogramming is extremely rapid and economical. However, there are many examples of non-volatile memories which exist in the prior art which can be employed in lieu of the memory shown in FIG. 3. A non-volatile memory will retain the data stored therein upon an interruption or loss of power and of course, this type of memory offers further advantages in such a system.

I claim:

1. An electronic lock and key system for activating a control mechanism to permit entry to a secured area, comprising:

(a) key means having located thereon a selected one of a plurality of unique digital codes, said key means having said selected code impressed thereon with selected bits of said code arranged in a plurality of information bearing tracks, said key means further including a clock track having a predetermined number of bits located thereon and indicative of a storage sequence, with said clock track positioned centrally on said key means and having number of information bearing tracks above and below said clock track, (b) receptacle means for receiving said key means and for providing an electrical signal indicative of said selected code, said receptacle means including clock detecting means responsive to said clock bits for providing a timing signal indicative of the position of each bit in each of said information bearing tracks, (c) processor means including a memory coupled to said clock means and operative in a first storage mode responsive to said signal for storing said selected code upon insertion of said key means in said receptacle during said first mode in predetermined locations according to said clock bits and operative in a second mode responsive to said timing signal for comparing each bit as stored in said location only during the clock bit indicative of the position of that bit as stored for thereafter comparing said selected code as manifested by said electrical signal with said code as stored to provide a comparison between the same, and (d) means providing a signal for activating said control mechanism upon a favorable comparison.

2. The electronic lock and key system according to claim 1 wherein said digital code as impressed upon said key comprises an optical code wherein one binary condition is stored on said key as a light transmitting area.

3. The electronic lock and key system according to claim 1 wherein said digital code as impressed upon said key is a magnetic code.

4. An electronic access system for activating a control mechanism to permit access to a secured area, comprising:

(a) a planar member having located thereon a selected one of a plurality of unique digital codes, said planar member containing said code in a plurality of information bearing tracks, with selected bits of said code stored in each of said tracks, and having a separate control track on said planar member for determining the position of each bit in the code to be stored, with said control track positioned centrally on said key means and having number of information tracks above and below said control track, (b) receptacle means for receiving said member by insertion of said member into said receptacle, (c) means responsive to the insertion of said member in said receptacle to provide an electrical signal indicative of said selected code, and including clock means responsive to the data stored in said control track for providing a timing signal, (d) processor means including a memory, said processor means responsive to said timing signal, having first and second modes of operation accessible by switching means included in said processor, said first mode indicative of a first setting of said switching means and operative upon insertion of said member in said receptacle to store said digital code in said memory strictly according to the timing signal to store each bit in a position indicative of said timing signal, and operative in a second mode to compare said stored code with said electrical signal indicative of said selected code strictly according to said timing signal to thereby compare each bit in said electrical signal with a bit stored in memory as determined by said timing signal, and (e) means for providing a signal for activating said control mechanism upon a favorable comparison, wherein said selected one of said codes as located on said planar member will only provide said favorable comparison due to the storage of said one code in said first mode.

5. The access system according to claim 4 wherein said memory comprises a plurality of locations, each one capable of storing one bit of said digital code.

6. The access system according to claim 4 wherein said receptacle means is a door knob having a key accommodating slot for insertion of said planar member.

7. The access system according to claim 4 further including a further processor means coupled in parallel with said processor means to enable storage therein of another code associated with another planar member to thereby permit access to said secured area upon insertion into said receptacle of a planar member having either of said codes impressed thereon.

8. The access system according to claim 4 wherein said code as impressed upon said card is in the form of optical data.

9. The access system according to claim 4 wherein said code in each information track is a binary code with the maximum number of unique codes manifested by $2^n$, where "n" is a positive integer greater than one.

* * * * *